United States Patent [19]

Ota

[11] Patent Number: 5,506,736
[45] Date of Patent: Apr. 9, 1996

[54] MEMORY ARRANGEMENT FOR TAPE CASSETTES USED IN RECORDING AND/OR REPRODUCTION

[75] Inventor: Shuichi Ota, Kanagawa, Japan

[73] Assignee: Sony Corporation, Tokyo, Japan

[21] Appl. No.: 151,203

[22] Filed: Nov. 12, 1993

[30] Foreign Application Priority Data

Nov. 25, 1992 [JP] Japan .................................. 4-336779

[51] Int. Cl.[6] ...................... G11B 15/04; G11B 15/675; G11B 19/04; G11B 23/02
[52] U.S. Cl. .................... 360/94; 360/60; 360/96.5; 360/133; 242/344; 242/346
[58] Field of Search ................................ 360/60, 92, 94, 360/96.5, 132, 137; 242/338, 338.2, 341, 342, 344, 346

[56] References Cited

U.S. PATENT DOCUMENTS

| | | | |
|---|---|---|---|
| 4,593,337 | 6/1986 | Leone et al. | 360/137 |
| 4,743,984 | 5/1988 | Ryan | 360/60 |
| 4,839,875 | 6/1989 | Kuriyama et al. | 360/132 |
| 4,844,377 | 7/1989 | Shiomi et al. | 360/60 |
| 4,844,378 | 7/1989 | Oishi | 360/132 |
| 5,016,834 | 5/1991 | Sato et al. | 360/94 |
| 5,140,487 | 8/1992 | Tanaka et al. | 360/132 |
| 5,291,346 | 3/1994 | Baekgaard | 360/60 |
| 5,325,255 | 6/1994 | Dodt et al. | 360/132 |
| 5,390,870 | 2/1995 | Sawada et al. | 242/344 |

FOREIGN PATENT DOCUMENTS

| | | |
|---|---|---|
| 796553 | 3/1973 | Belgium . |
| 0274544 | 7/1988 | European Pat. Off. . |
| 0572925 | 12/1993 | European Pat. Off. . |
| 3435506 | 4/1986 | Germany . |

*Primary Examiner*—Stuart S. Levy
*Assistant Examiner*—Jefferson Evans
*Attorney, Agent, or Firm*—Ronald P. Kananen

[57] ABSTRACT

A set of tape cassettes of different sizes which each includes electric information representing terminals and which are used with a common recording and/or reproduction apparatus and a recording and/or reproduction apparatus with which those tape cassettes can be selectively used are improved in that information represented by the electric information representing terminals is read by a detection arrangement common to the tape cassettes of the different sizes. The electric information representing terminals are disposed at equal distances on the tape cassettes from corresponding outer side faces of the tape cassettes. A detection block, on which a connector for contacting with the electric information representing terminals provided on a tape cassette to read electric information and a detection switch for detecting a wrong erasure preventing element provided on the tape cassette are provided integrally, is moved, in response to a size of a tape cassette loaded in position into the recording and/or reproduction apparatus, to a position determined for the size in advance.

3 Claims, 11 Drawing Sheets

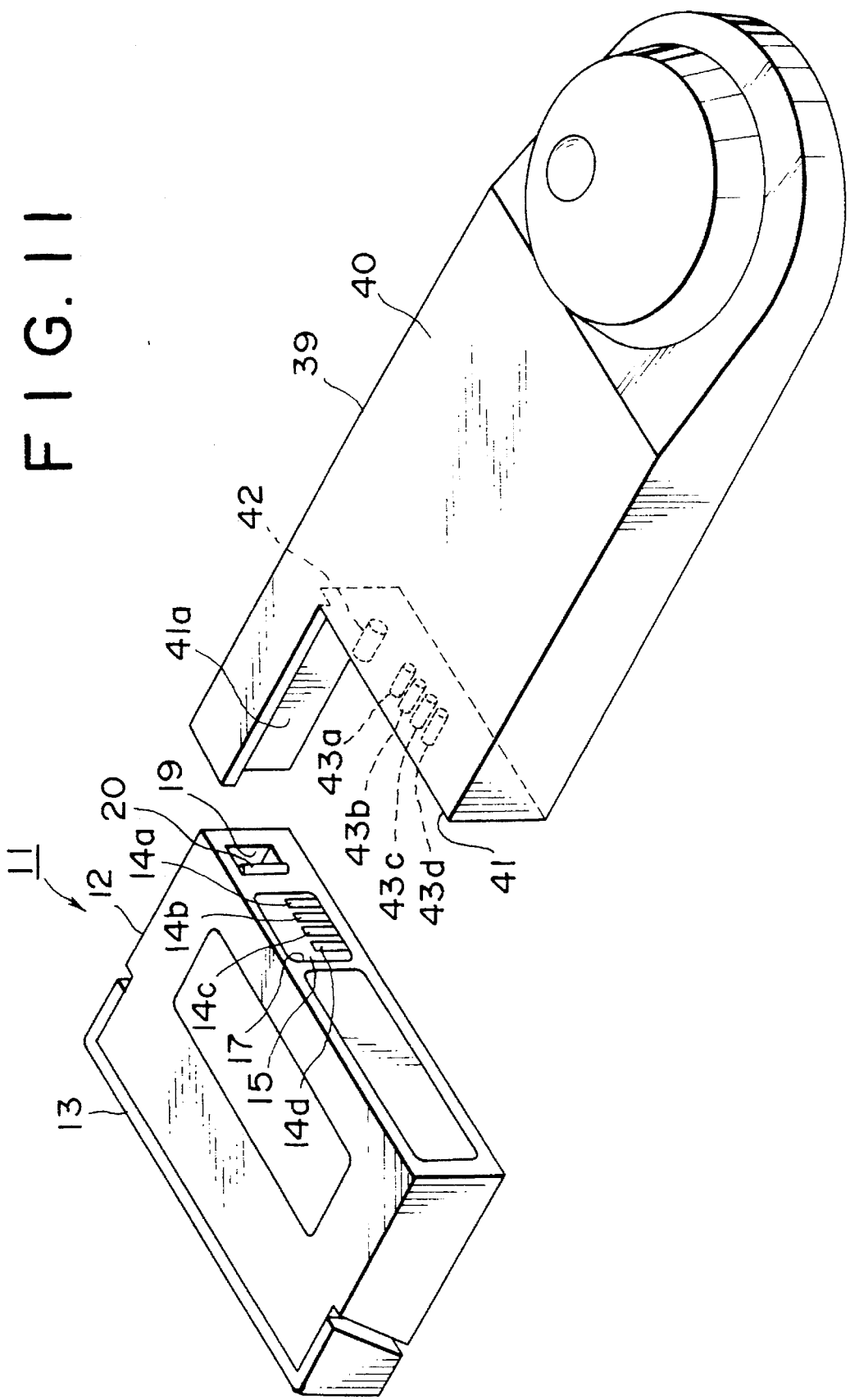

5,506,736

MEMORY ARRANGEMENT FOR TAPE CASSETTES USED IN RECORDING AND/OR REPRODUCTION

BACKGROUND OF THE INVENTION

1. Field of the Invention

This invention relates to a novel set of tape cassettes and a novel recording and/or reproduction apparatus, and more particularly to a set of tape cassettes of different sizes which each includes electric information representing terminals representing a plurality of pieces of information regarding the tape cassette and which are used with a common recording and/or reproduction apparatus as well as a recording and/or reproduction apparatus with which those tape cassettes can be selectively used by reading information represented by the electric information representing terminals by detection means common to the tape cassettes of the different sizes.

2. Description of the Related Art

A conventional tape cassette is sometimes provided with electric information representing terminals representing a plurality of pieces of information regarding the tape cassette. When a tape cassette of the type mentioned is inserted in position into a recording and/or reproduction apparatus, the information represented by the electric information representing terminals is read by detection means provided on the recording and/or reproduction apparatus.

By the way, one of recording and/or reproduction apparatus in which a tape cassette is used is constructed as a recording and/or reproduction apparatus of a type called compatible type wherein a set of tape cassettes of different sizes such as a large size and a small size can be selectively used.

When a set of tape cassettes provided with electric information representing terminals described above are used in a video tape recorder of the compatible type, it is a common practice to set loaded cassette positions of the tape cassettes so that the positions of a tape exit and a recessed or mouth portion through which a tape is actually led out of the tape cassette and some other portions may be common to the tape cassettes of different sizes such that, for the convenience of a tape extracting operation, that is, for the convenience of a tape loading operation, the tape extracting position may be common to the tape cassettes. Consequently, it cannot be avoided that the positions of the electric information representing elements are different between the tape cassettes of the difference sizes. Accordingly, different detection means must necessarily be provided for the tape cassettes of the different sizes.

SUMMARY OF THE INVENTION

It is an object of the present invention to provide a set of tape cassettes which have different electric information representing terminals which can be read by common detection means.

It is another object of the present invention to provide a recording and/or reproduction apparatus which can read information represented by electric information representing terminals of tape cassettes of different sizes by means of common detection means.

In order to attain the objects described above, according to an aspect of the present invention, there is provided a set of tape cassettes having different sizes and used with a common recording and/or reproduction apparatus, each of the tape cassettes comprising a plurality of electric information representing terminals representing information regarding the tape cassette, the electric information representing terminals being disposed at equal distances on the tape cassettes from corresponding outer side faces of the tape cassettes.

With the tape cassettes, since the electric information representing terminals are disposed at equal distances on the tape cassettes from the corresponding outer side faces thereof, a single detection means for contacting with the electric information representing elements can be used as common detection means for the tape cassettes of different sizes, for example, by moving and positioning the detection means with reference to the outer side face of the tape cassette.

According to another aspect of the present invention, there is provided a recording and/or reproduction apparatus, which comprises a connector for contacting with electric information representing terminals provided on a tape cassette to read electric information, a detection switch for detecting a wrong erasure preventing element provided on the tape cassette, and a detection block having the connector and the detection switch provided integrally thereon.

With the recording and/or reproduction apparatus, where tape cassettes for use therewith are constructed such that electric information representing terminals representing information of the tape cassettes are disposed at equal distances thereon from corresponding outer side faces thereof, a single detection means provided on the detection block for contacting with the electric information representing elements can be used as common detection means for the tape cassettes of different sizes, for example, by moving and positioning the detection means with reference to the outer side face of the tape cassette.

According to a further aspect of the present invention, there is provided a remote control commander for use with a tape cassette which has electric information representing terminals representing information regarding the tape cassette, which comprises receiving means for receiving the tape cassette, and means for reading out information from the electric information representing terminals of the tape cassette and outputting the information to display means.

With the remote control commander, where tape cassettes for use therewith are constructed such that electric information representing terminals representing information of the tape cassettes are disposed at equal distances thereon from corresponding outer side faces thereof, the electric information representing terminals of the tape cassettes can be read commonly by the remote commander and consequently can be displayed suitably on a display screen or a like element.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 11 is a schematic perspective view illustrating reading of the connector shown in FIG. 8 using a remote control commander.

DETAILED DESCRIPTION OF THE PREFERRED EMBODIMENT

Figure 1:
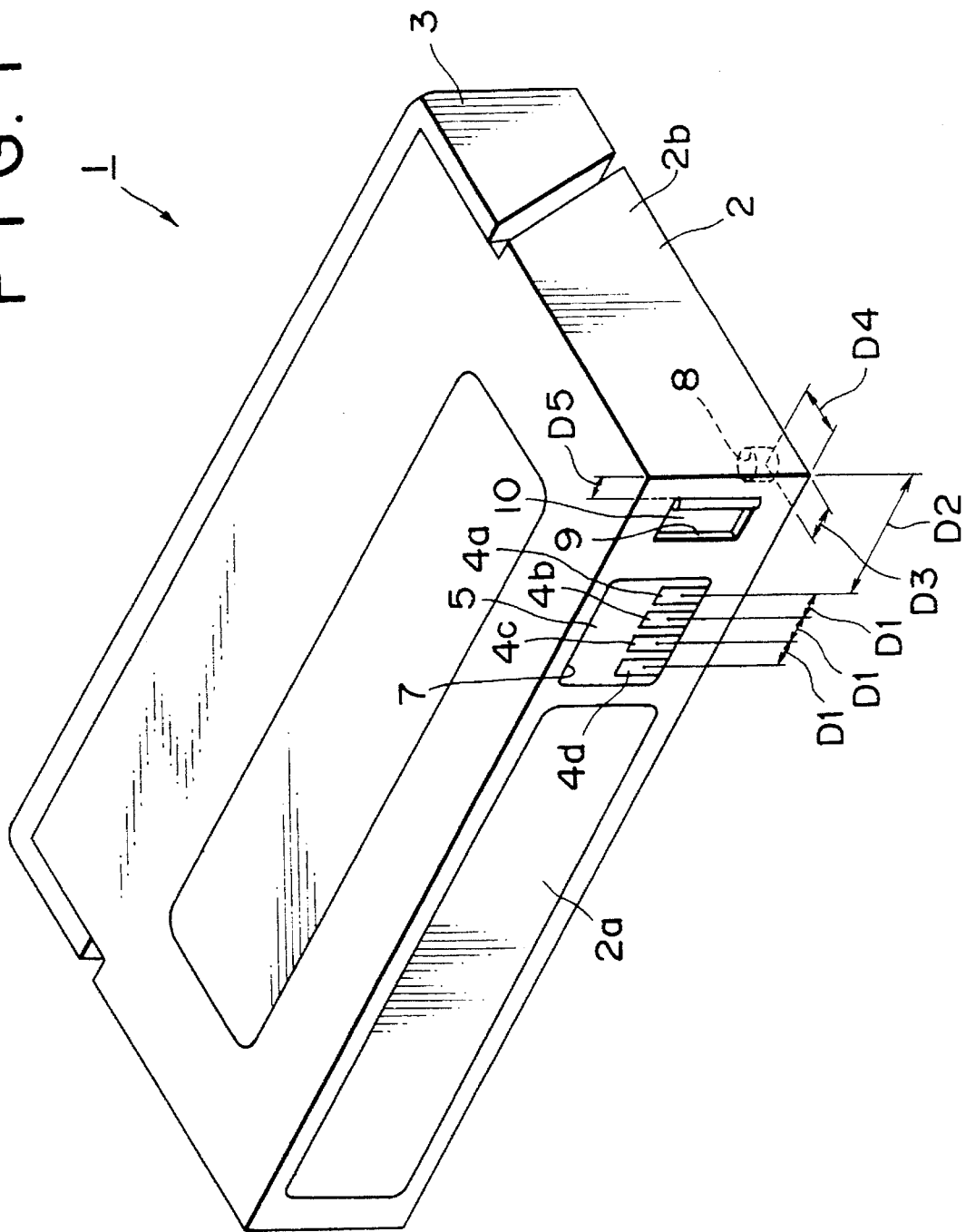
FIG. 1 is a perspective view of a large size tape cassette to which the present invention is applied.

Referring first to FIG. 1, there is shown a tape cassette to which the present invention is applied. The tape cassette 1 shown has a comparatively large size and will be hereinafter referred to as large size tape cassette.

The large size tape cassette 1 includes a cassette case 2 in the form of a flattened box which has a leftwardly and rightwardly elongated rectangular shape as viewed in plan and has a comparatively small vertical dimension or thickness.

A pair of tape reels not shown are accommodated for individual rotation in the cassette case 2, and a magnetic tape not shown is fixed at the opposite ends thereof to and wound around the tape reels. The magnetic tape is partially led out to the outside of the cassette case 2 from a tape exit not shown formed in a front wall of the cassette case 2 and is positioned along the front face of the cassette case 2.

A front lid 3 is supported for pivotal motion in the vertical upward and downward directions at a front end portion of the cassette case 2 to open or close the front face of the magnetic tape positioned along the front face of the cassette case 2.

Figure 2:
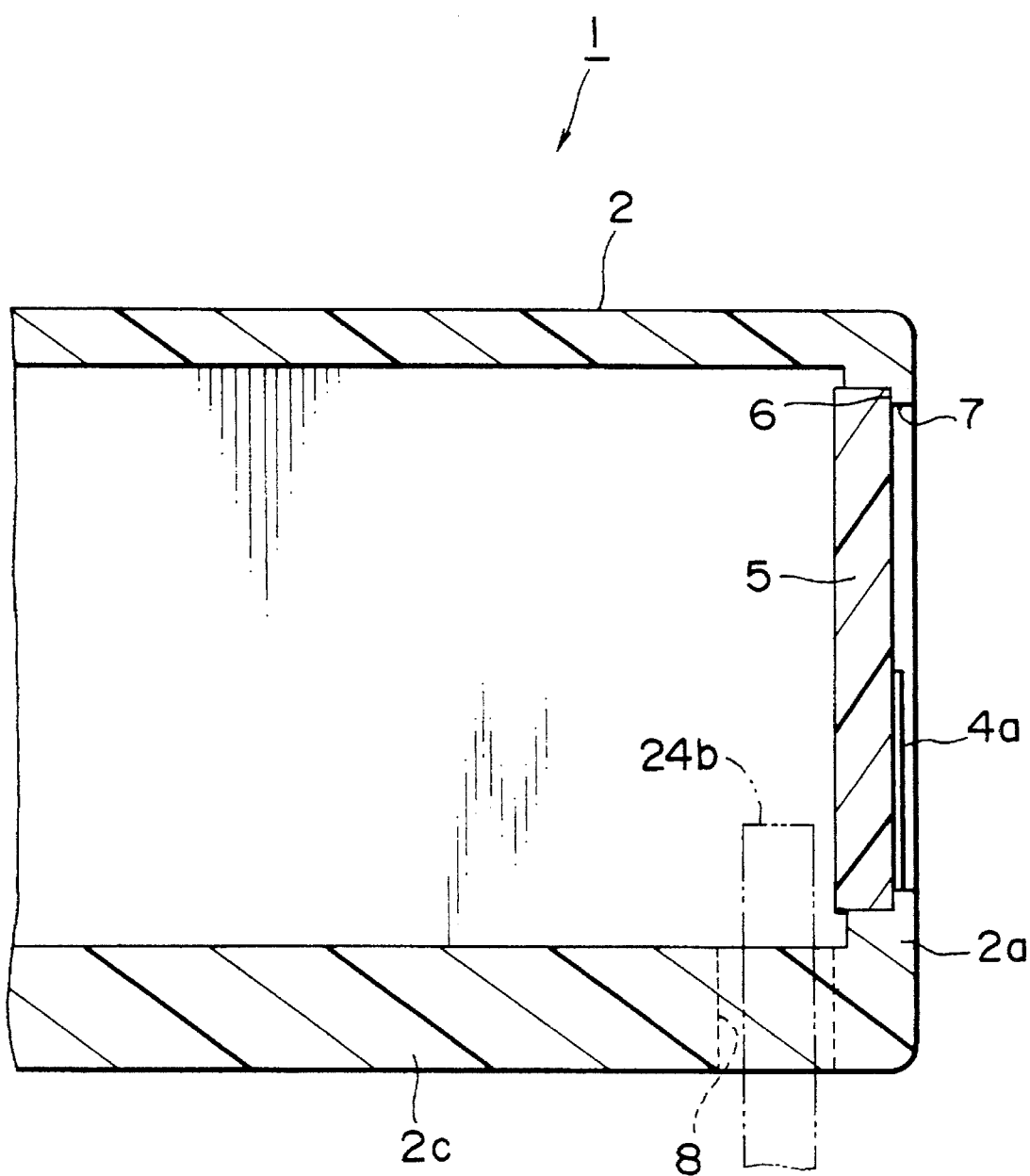
FIG. 2 is a partial enlarged sectional view of the large size tape cassette shown in FIG. 1.

Four electric information representing terminals 4a, 4b, 4c and 4d are disposed on the rear face of the cassette case 2 and exposed to the outside of the cassette case 2. The electric information representing terminals 4a to 4d are formed on a printed circuit board 5. Referring also to FIG. 2, the printed circuit board 5 is fitted in and secured to a shallow recess 6 formed on the inner face of a rear wall 2a of the cassette case 2 such that the electric information representing terminals 4a to 4d are directed rearwardly and exposed to the outside of the cassette case 2 through a window 7 formed contiguously to the recess 6 in the rear wall 2 a.

The terminal 4a serves as a power source terminal to be connected to a power source not shown, and each of the other three terminals 4b, 4c and 4d provides a signal representing a binary signal of "0" or "1" depending upon whether or not it is connected to the power source terminal 4a. Thus, a plurality of pieces of information are represented by three binary signals, that is, a signal of three bits. In this instance, the electric information representing terminals 4a to 4d may be constructed as terminals of an IC (integrated circuit) mounted on the printed circuit 5 and having predetermined information recorded therein.

The electric information representing terminals 4a to 4d are arranged at an equal distance D1 in a widthwise direction, that is, in the leftward and rightward direction, and the rightmost terminal 4a is spaced by another distance D2 from a right outer side face 2b of the cassette case 2.

A wrong erasure preventing discrimination hole 8 is formed at a right rear end portion of a bottom wall 2c of the cassette case 2 while a wrong erasure preventing discrimination window 9 is formed at a position of the rear wall 2a of the cassette case 2 intermediate between the terminal 4a and the right outer side face 2b.

The wrong erasure preventing discrimination hole 8 is spaced by a distance D3 from the right outer side face 2b and by another distance D4 from the rear wall 2a. Further, the wrong erasure preventing discrimination window 9 is spaced by a further distance D5 from the right outer side face 2b.

A slide element 10 is disposed for leftward and rightward movement at a right rear end portion in the cassette case 2. When the slide element 10 is positioned at the left end of the range of movement thereof, the wrong erasure preventing discrimination window 9 is open and also the wrong erasure preventing discrimination hole 8 is open. This is a recording enabling condition. On the contrary, when the slide element 10 is positioned at the right end of the range of movement thereof, it closes the wrong erasure preventing discrimination window 9 and also closes the wrong erasure preventing discrimination hole 8. This is a recording disabling condition.

Figure 3:
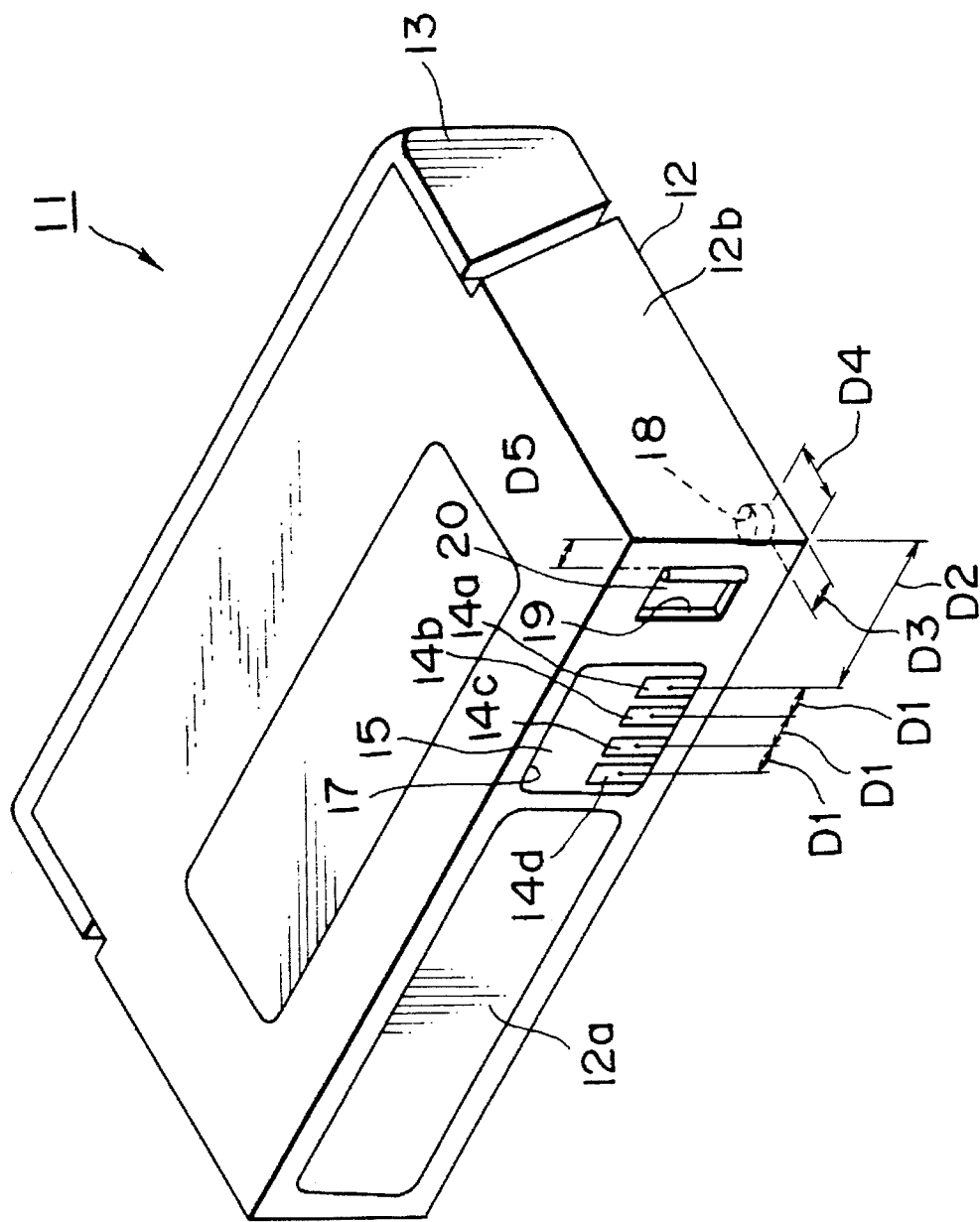
FIG. 3 is a perspective view of a small size tape cassette to which the present invention is applied.

Referring now to FIG. 3, there is shown another tape cassette to which the present invention is applied. The tape cassette 11 has a comparatively small size and will be hereinafter referred to as small size tape cassette.

The small size tape cassette 11 includes a cassette case 12 in the form of a flattened box which has a leftwardly and rightwardly elongated rectangular shape as viewed in plan and has a comparatively small vertical dimension or thickness. The cassette case 12 is formed considerably small in both of the depthwise dimension and the widthwise dimension comparing with the cassette case 2 of the large size tape cassette 1. The cassette case 12 further has a thickness or height a little smaller than the cassette case 2 of the large size cassette 1.

A pair of tape reels not shown are accommodated for individual rotation in the cassette case 12, and a magnetic tape not shown is fixed at the opposite ends thereof to and wound around the tape reels. The magnetic tape is partially led out to the outside of the cassette case 12 from a tape exit not shown formed in a front wall of the cassette case 12 and is positioned along the front face of the cassette case 12.

A front lid 13 is supported for pivotal motion in the vertical upward and downward directions at a front end portion of the cassette case 12 to open or close the front face of the magnetic tape positioned along the front face of the cassette case 12.

Figure 4:
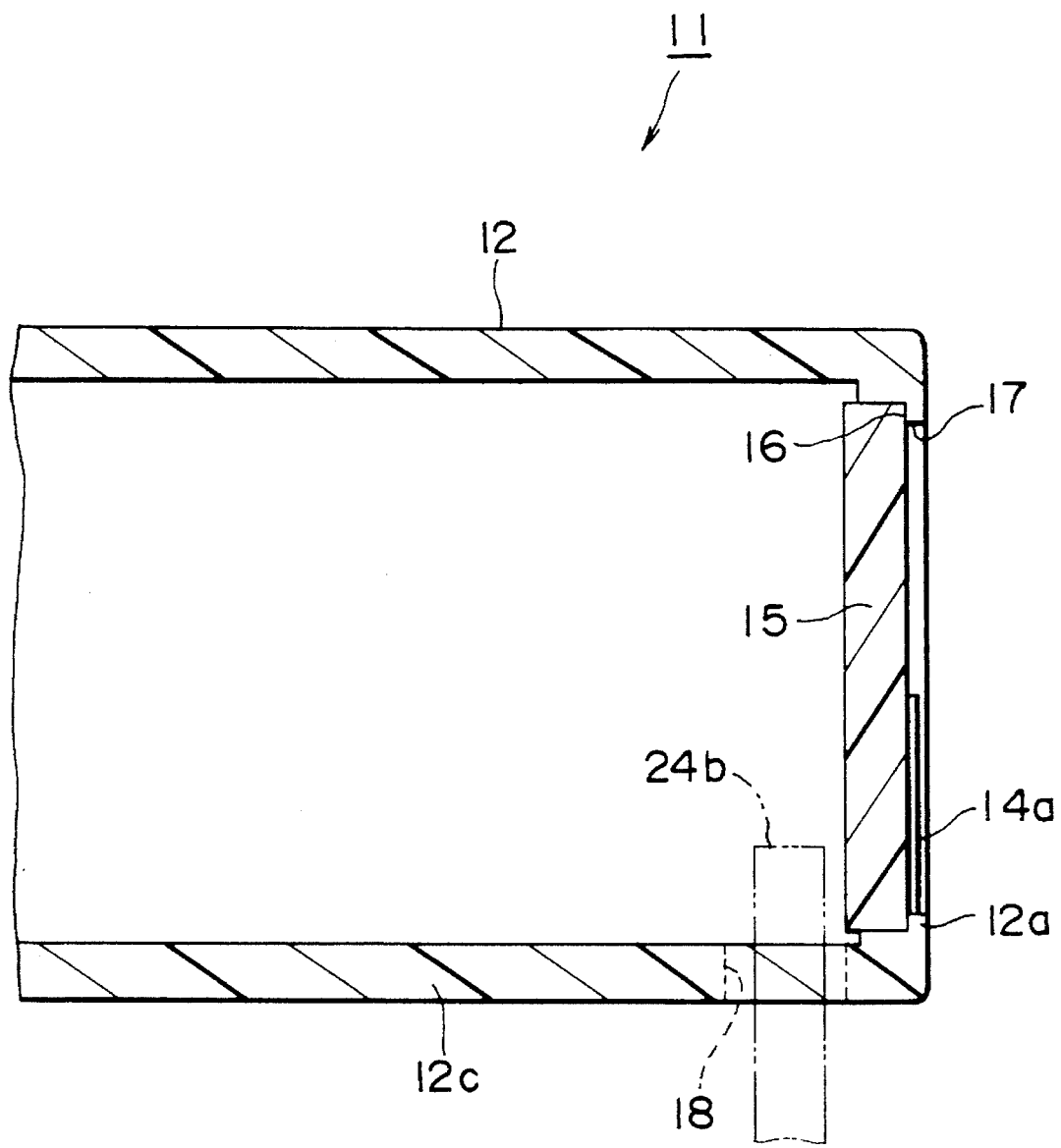
FIG. 4 is a partial enlarged sectional view of the small size tape cassette shown in FIG. 3.

Four electric information representing terminals 14a, 14b, 14c and 14d are disposed on the rear face of the cassette case 12 and exposed to the outside of the cassette case 12. Also the electric information representing terminals 14a to 14d are formed on a printed circuit board 15. Referring also to FIG. 4, the printed circuit board 15 is fitted in and secured to a shallow recessed portion 16 formed on the inner face of a rear wall 12a of the cassette case 12 such that the electric information representing terminals 14a to 14d are directed rearwardly and exposed to the outside of the cassette case 12 through a window 17 formed in the recessed portion 16.

Also with the small size tape cassette 11, the terminal 14a serves as a power source terminal to be connected to the power source, and each of the other three terminals 14b, 14c and 14d provides a signal representing a binary signal of "0" or "1" depending upon whether or not it is connected to the power source terminal 14a so that a plurality of pieces of information may be represented by three binary signals, that is, a signal of three bits. In this instance, similarly as with the large size tape cassette 11, the electric information representing terminals 14a to 14d may be constructed as terminals of an IC (integrated circuit) mounted on the printed circuit 15 and having predetermined information recorded therein.

The electric information representing terminals 14a to 14d are arranged at the equal distance D1 in the widthwise direction, and the rightmost terminal 14a is spaced by the distance D2 from a right outer side face 12b of the cassette case 12.

A wrong erasure preventing discrimination hole 18 is formed at a right rear end portion of a bottom wall 12c of the cassette case 12 while a wrong erasure preventing discrimination window 19 is formed at a position of the rear wall 12a of the cassette case 12 intermediate between the terminal 14a and the right outer side face 12b.

The wrong erasure preventing discrimination hole 18 is spaced by the distance D3 from the right outer side face 12b and by the distance D4 from the rear wall 12a. Further, the wrong erasure preventing discrimination window 19 is spaced by the distance D5 from the right outer side face 12b.

The distances D1 to D5 are equal to the distances D1 to D5 of the large size tape cassette 1, respectively.

A slide element 20 is disposed for leftward and rightward movement at a right rear end portion in the cassette case 12. When the slide element 20 is positioned at the left end of the range of movement thereof, the wrong erasure preventing discrimination window 19 is open and also the wrong erasure preventing discrimination hole 18 is open. This is a recording enabling condition. On the contrary, when the slide element 20 is positioned at the right end of the range of movement thereof, it closes the wrong erasure preventing discrimination window 19 and also closes the wrong erasure preventing discrimination hole 18. This is a recording disabling condition.

Figure 5:
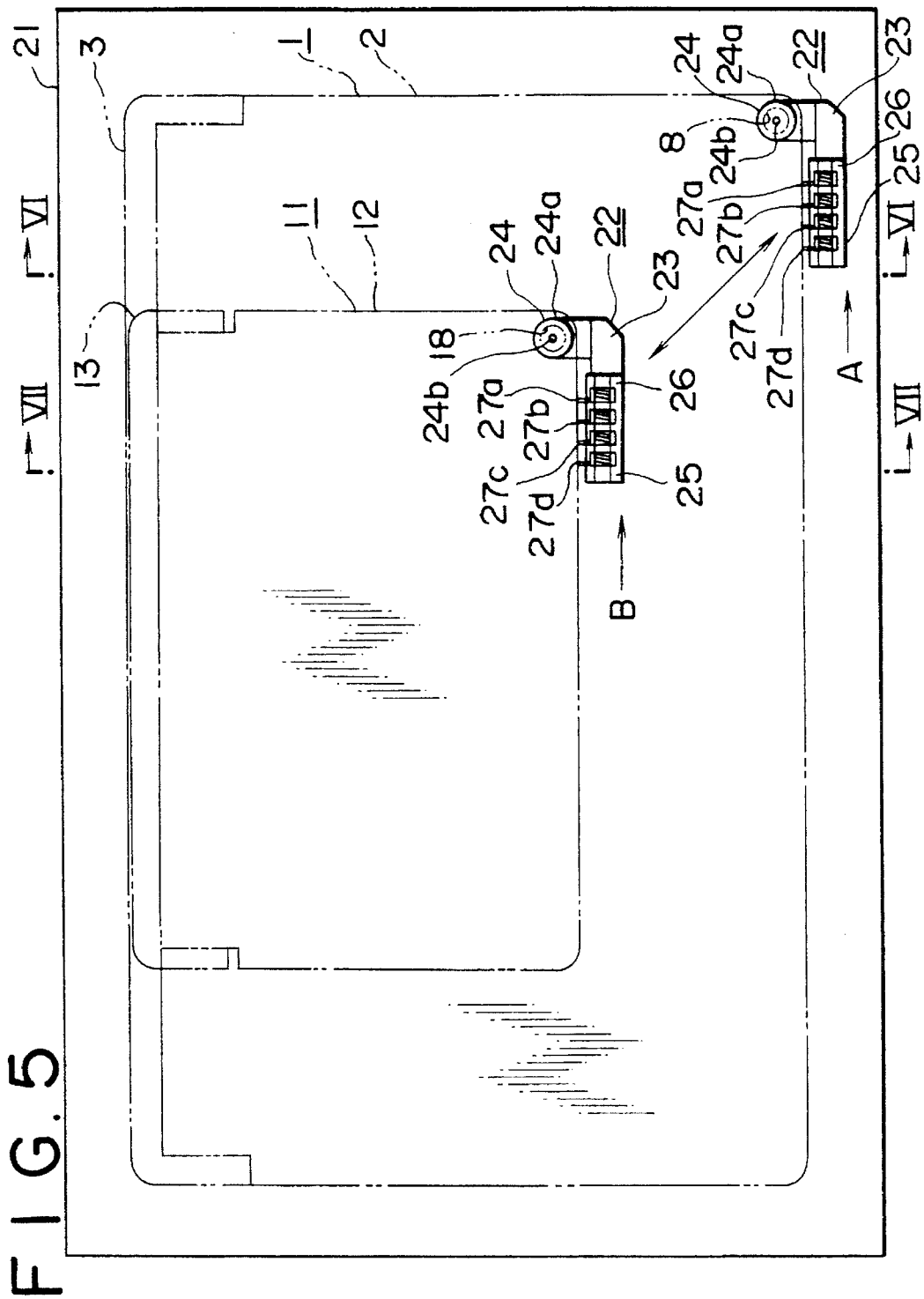
FIG. 5 is a schematic plan view showing, in an overlapping condition, the large size tape cassette shown in FIG. 1 and the small size tape cassette shown in FIG. 3 loaded in position in a recording and/or reproduction apparatus to which the present invention is applied.

Referring now to FIG. 5, there is shown a recording and/or reproduction apparatus to which the present invention is applied. The recording and/or reproduction apparatus shown is a video tape recorder 21 of the compatible type in which both of the large and small size tape cassettes 1 and 11 can be selectively used.

Figure 6:
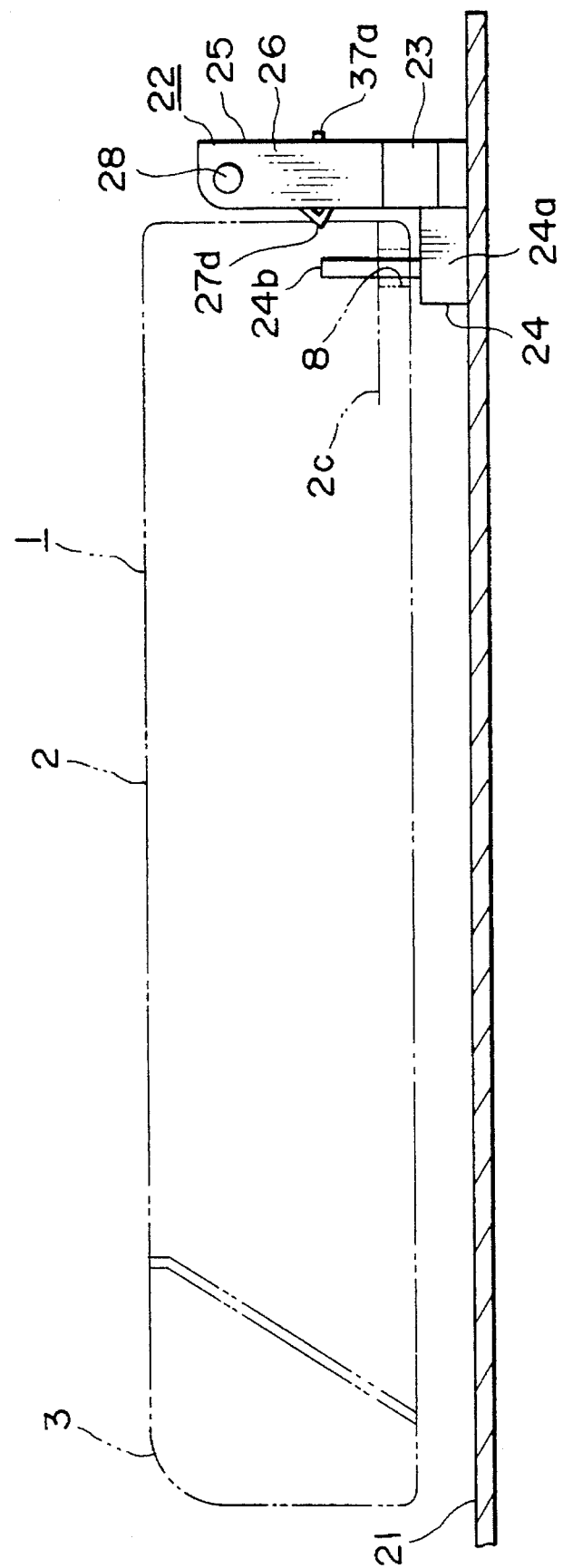
FIG. 6 is a sectional view taken along line VI—VI of FIG. 5.
Figure 7:
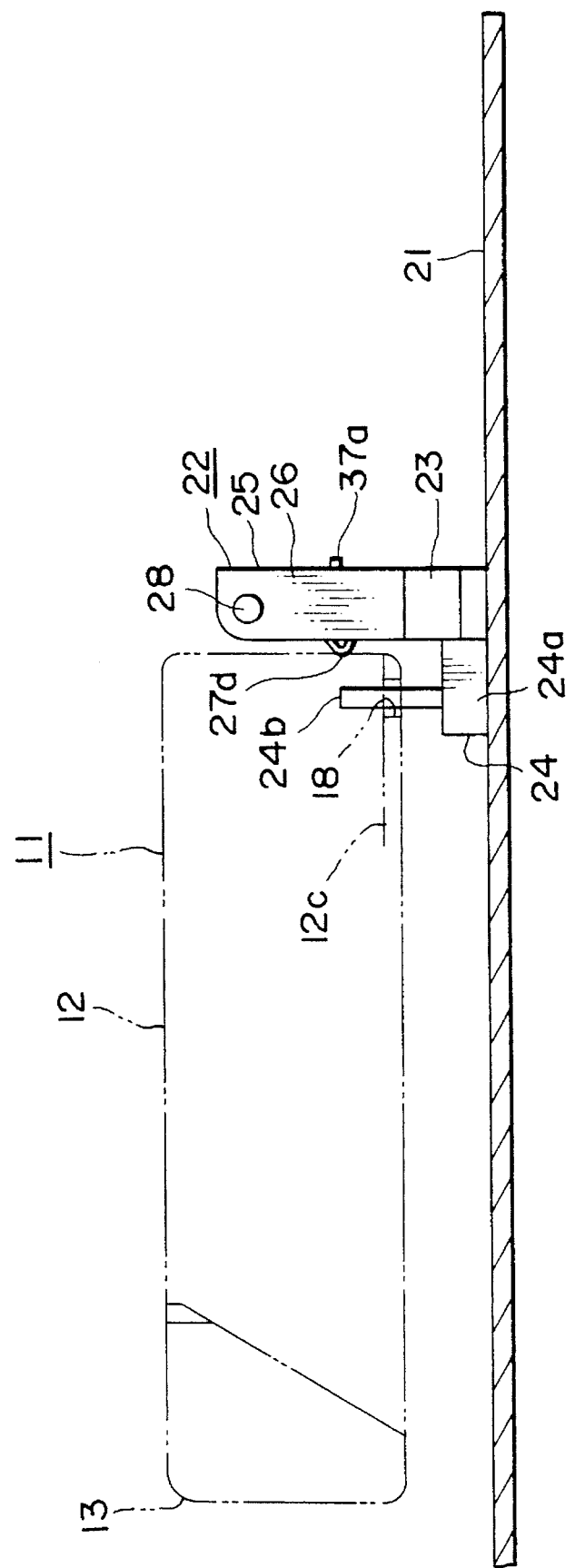
FIG. 7 is a sectional view taken along line VII—VII of FIG. 5.
Figure 8:
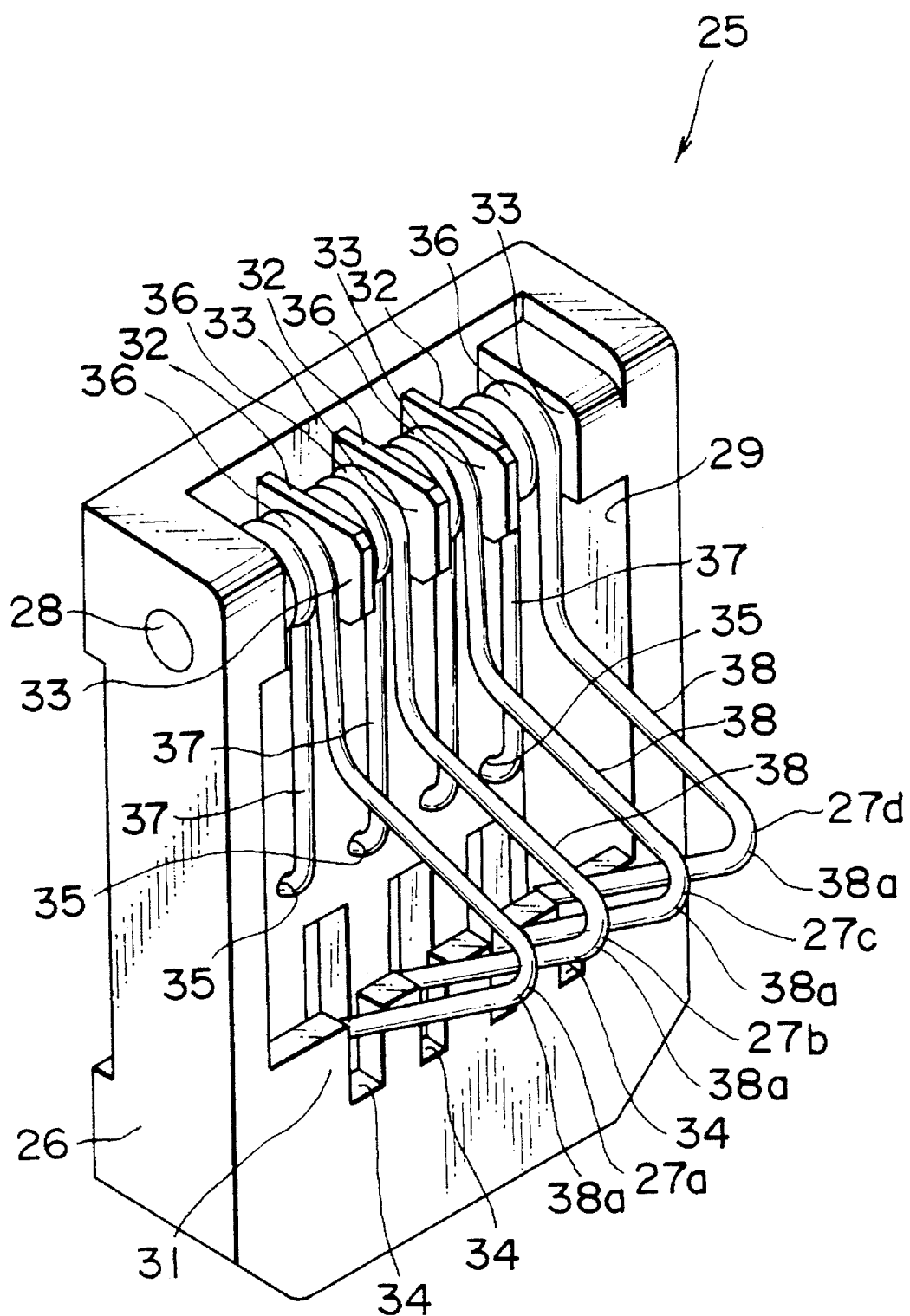
FIG. 8 is a perspective view showing a connector used in the recording and/or reproduction apparatus shown in FIG. 5.
Figure 9:
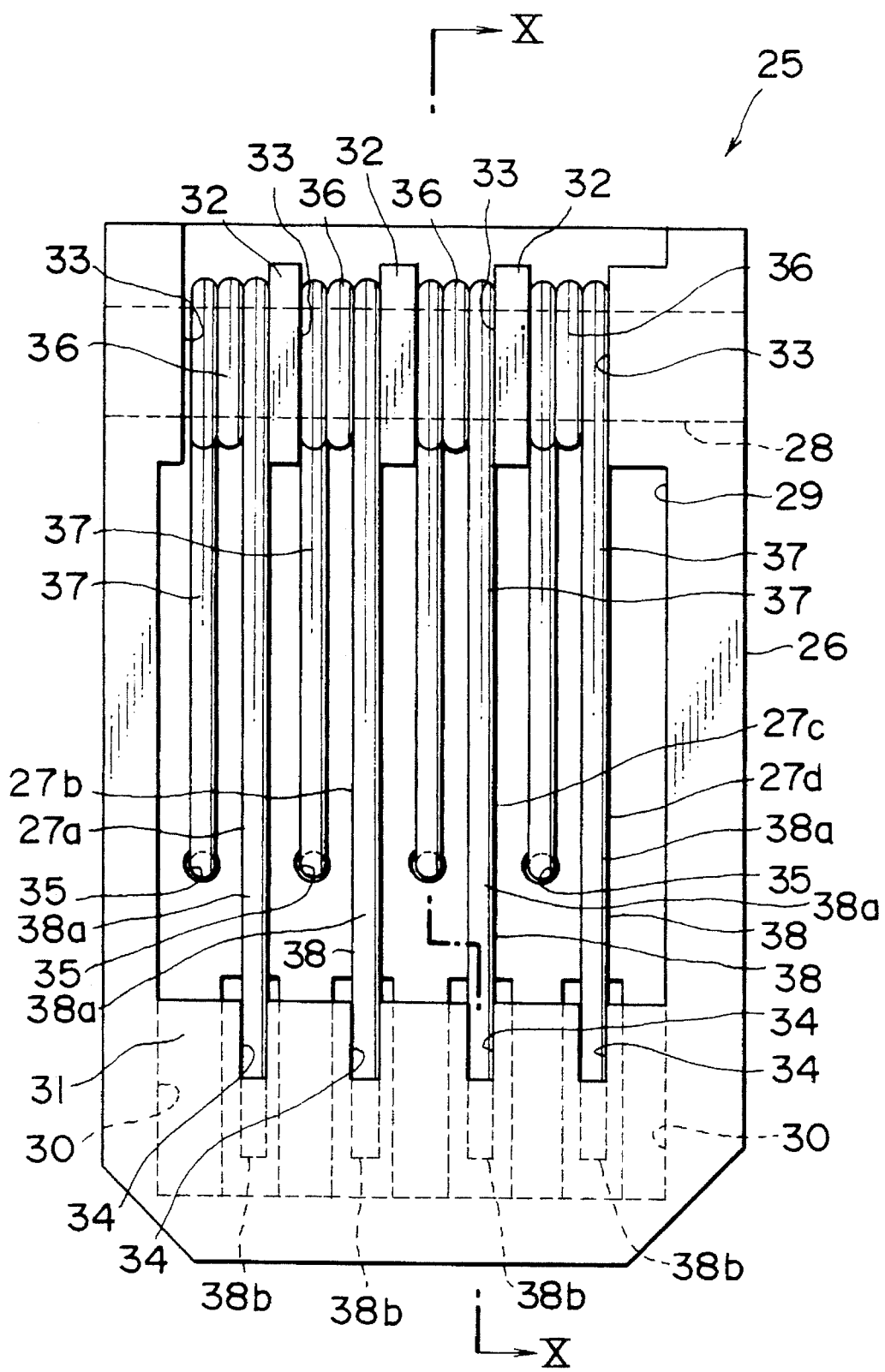
FIG. 9 is a front elevational view of the connector shown in FIG. 8.
Figure 10:
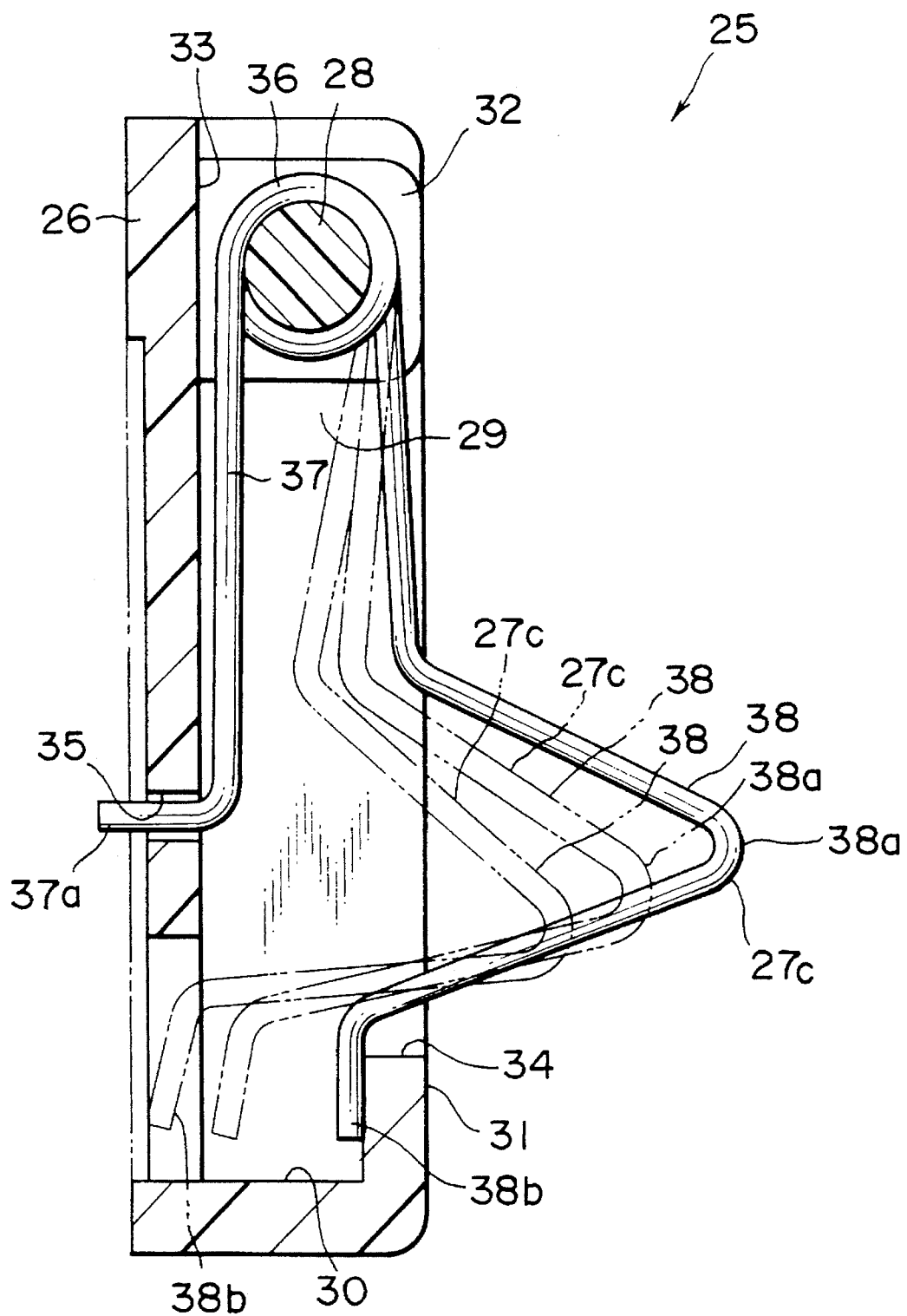
FIG. 10 is a sectional view taken along line X—X of FIG. 9.

Referring also to FIGS. 6 and 7, the video tape recorder 21 includes a detection block 22. The detection block 22 includes a movable base 23 on which a connector 25 for reading information represented by the electric information representing terminals 4a to 4d or 14a to 14d of the tape cassette 1 or 11 and a wrong erasure preventing discrimination switch 24 for detecting an open/closed condition of the wrong erasure preventing discrimination hole 8 or 18 are integrally supported.

The base 23 has a generally L-shape as viewed from above, and the wrong erasure preventing discrimination switch 24 is supported on an upper face of a projection which projects forwardly a little from a right end portion of the base 23. A detection pin 24b extends upwardly from an upper end of a case 24a of the wrong erasure preventing discrimination switch 24.

The connector 25 is mounted on an upper face of a portion of the base 23 which extends in the widthwise direction, that is, in the leftward and rightward direction.

Referring also to FIGS. 6 to 9, the connector 25 includes a casing 26, detection contacts 27a, 27b, 27c and 27d, and a support shaft 28 for supporting the detection contacts 27a to 27d on the casing 26.

The casing 26 is formed from an insulating material such as a synthetic resin and has an arrangement recess 29 formed in a front wall thereof such that it is open to the front and the top thereof. An escape recess 30 is formed at a position of a rear wall adjacent a lower end of the casing 26 such that it connects to the lower end of the arrangement recess 29. An eave-like portion 31 which covers over the front face of a lower portion of the arrangement recess 29 is formed by a portion of the casing 26 which defines the escape recess 30.

Three support walls 32 are provided in an equally spaced relationship from each other in a horizontal row at an upper end portion of the arrangement recess 29 such that four supporting spaces 33 of an equal distance are defined between the support walls 32 and between opposite end ones of the support walls 32 and opposing left and right inner side faces of the arrangement recess 29. The eave-like portion 31 has four positioning recesses 34 formed at positions thereof corresponding to the supporting spaces 33.

Four through-holes 35 are formed at and extend forwardly and rearwardly through intermediate portions in the vertical direction of the bottom of the arrangement recess 29 of the casing 26 on straight lines interconnecting the supporting spaces 33 and the corresponding positioning recesses 34 as viewed in the forward and rearward direction.

Each of the detection contacts 27a to 27d is formed from a wire spring material having electric conductivity.

Each of the detection contacts 27a to 27d is formed as a torsion spring and has a rear portion 37 and a front portion 38 formed integrally with each other with an intermediate coiled portion 36 interposed therebetween. The rear portion 37 has a connection portion 37a formed at an end portion thereof such that it is bent perpendicularly rearwardly with respect to the remaining portion.

A portion adjacent the end of the front portion 38 of each of the detection contacts 27a to 27d is bent forwardly such that the front portion 38 may present an inverted V-shape thereby to form a contacting portion 38a, and a portion 38b extending substantially downwardly from the end of the contacting portion 38a serves as an arresting portion.

Each of the detection contacts 27a to 27d is disposed such that the coiled portion 36 thereof is disposed in the corresponding supporting space 33 of the casing 36 and the portion of the rear portion 37 other than the connection portion 37a is positioned along the inner bottom face of the arrangement recess 29 of the casing 26 while the connection portion 37a extends from the front to the rear through the corresponding throughhole 35 such that a rear end portion thereof projects rearwardly from the rear face of the casing 26.

A lower end portion of the contacting portion 38a of the front piece 38 of each of the detection contacts 27a to 27d is positioned for forward and rearward movement in the corresponding positioning recess 34 while the arresting portion 38b is opposed from rearwardly to a portion of the rear face of the eave-like portion 31 below a lower edge of the corresponding positioning recess 34. When the position of the coiled portion 36 is fixed as hereinafter described and the front piece 38 is not pressed from above, since the front piece 38 is biased to pivot forwardly, the arresting portion 38b thereof is engaged with the rear face of the eave-like portion 31 to position the front portion 38 in the forward and rearward direction.

While the detection contacts 27a to 27d are disposed in such a condition as described above in the casing 26, the support shaft 28 is fitted into a rear end portion of the wall of the casing 26, which defines the left and right ends of the arrangement recess 29, the support walls 32 and the coiled portions 36 of the detection contacts 27 and is secured to the casing 26 in this condition. Consequently, the detection contacts 27a to 27d are supported on the casing 26 in the condition described above.

When the large size tape cassette 1 is inserted in position into the video tape recorder 21, this is detected by the video tape recorder 21, and the video tape recorder 21 moves the detection block 22 to a large size cassette position indicated at A in FIG. 5.

Then, when the large size tape cassette 1 is moved down to the predetermined loaded cassette position, the detection pin 24b of the wrong erasure preventing discrimination switch 24 of the detection block 22 comes to a position corresponding to the wrong erasure preventing discrimination hole 8 of the large size tape cassette 1. Accordingly, when the wrong erasure preventing discrimination hole 8 is open, the detection pin 24b is inserted into the cassette case 2 through the wrong erasure preventing discrimination hole 8 without being pushed by any portion of the cassette case 2, and consequently, it is detected that the large size tape cassette 1 is a recordable or recording enabled tape cassette. On the contrary when the wrong erasure preventing. discrimination hole 8 is closed with the slide element 10, the detection pin 24b is relatively pushed into the case 24a of the wrong erasure preventing discrimination switch 24 by the slide element 10, and consequently, it is detected that the large size tape cassette 1 is a recording disabled tape cassette.

Meanwhile, when the large size tape cassette 1 is moved down toward the predetermined loaded cassette position, the detection contacts 27a to 27d of the connector 25 are pressed to be yieldably deformed rearwardly by the cassette case 2, and then when the large size tape cassette 1 comes to the loaded cassette position, the contacting portions 38a of the detection contacts 27a to 27d are contacted with the electric information representing terminals 4a to 4d of the large size tape cassette 1 by the resilient forces stored on the detection contacts 27a to 27d, respectively, thereby to allow reading of information represented by the electric information representing terminals 4a to 4d.

On the other hand, when the small size tape cassette 11 is inserted in position into the video tape recorder 21, this is detected by the video tape recorder 21, and the video tape recorder 21 moves the detection block 22 to a small size cassette position indicated at B in FIG. 5.

Then, when the small size tape cassette 11 is moved down to the predetermined loaded cassette position, the detection pin 24b of the wrong erasure preventing discrimination switch 24 of the detection block 22 comes to a position corresponding to the wrong erasure preventing discrimination hole 18 of the small size tape cassette 11. Accordingly, when the wrong erasure preventing discrimination hole 18 is open, the detection pin 24b is inserted into the cassette case 12 through the wrong erasure preventing discrimination hole 18 without being pushed by any portion of the cassette case 12, and consequently, it is detected that the small size tape cassette 11 is a recordable or recording enabled tape cassette. On the contrary when the wrong erasure preventing discrimination hole 18 is closed with the slide element 20, the detection pin 24b is relatively pushed into the cassette case 24a by the slide element 20, and consequently, it is detected that the small size tape cassette 11 is a recording disabled tape cassette.

Meanwhile, when the small size tape cassette 11 is moved down toward the predetermined loaded cassette position, the detection contacts 27a to 27d of the connector 25 are pressed to be yieldably deformed rearwardly by the cassette case 12, and then when the small size tape cassette 11 comes to the loaded cassette position, the contacting portions 38a of the detection contacts 27a to 27d are contacted with the electric information representing terminals 14a to 14d of the small size tape cassette 11 by the resilient forces stored on the detection contacts 27a to 27d, respectively, thereby to allow reading of information represented by the electric information representing terminals 4a to 4d.

In this manner, in the tape cassettes 1 and 11, since the electric information representing terminals 4a to 4d and 14a to 14d and the wrong erasure preventing discrimination holes 8 and 18 are positioned at the same distances from the reference positions, that is, from the right outer side faces 2b and 12b of the cassettes cases 2 and 12, respectively, only by moving the same detection block 22 to a position corresponding to a tape cassette inserted in position into the video tape recorder 21, the information of the tape cassette can be detected whether the tape cassette is a large size tape cassette or a small size tape cassette.

It is to be noted that, with the tape cassettes of the present invention described above, contents of information represented on them can be read by means of a common remote control commander and displayed on a screen or a like element.

Referring now to FIG. 11, such a remote control commander as described just above is shown and generally denoted at 39. The remote control commander 39 includes a casing 40 which has a recess 41 formed at a front end portion thereof. A right side face 41a of the recess 41 is used as a reference face.

A wrong erasure preventing discrimination switch 42 and four detection switches 43a, 43b, 43c and 43d are disposed on a face of the recess 41 of the casing 40 facing forwardly. The wrong erasure preventing discrimination switch 42 is disposed at a distance a little greater than the distance D5 from the reference face 41a; the detection switch 43a is disposed at the distance D2 from the reference face 41a; and the detection switches 43a, 43b, 43c and 43d are disposed at the equal distance D1.

Accordingly, if the remote control commander 39 and the rear face of the tape cassette 1 or 11 are moved relatively toward each other while the right outer side face 2b or 12b of the tape cassette 1 or 11 is contacted with the reference face 41a of the remote control commander 39, then the wrong erasure preventing discrimination switch 42 and the detection switches 43a to 43d are opposed to the wrong erasure preventing discrimination window 9 or 19 and the electric information representing terminals 4a to 4d or 14a to 14d, respectively, thereby to allow reading of information represented by the electric information representing terminals 4a to 4d or 14a to 14d.

Having now fully described the invention, it will be apparent to one of ordinary skill in the art that many changes and modifications can be made thereto without departing from the spirit and scope of the invention as set forth herein.

What is claimed is:

1. A set of tape cassettes comprising:

a first cassette;

a second cassette which is smaller than said first cassette;

a first erasure preventing element mounted on said first cassette, said first erasure preventing element being adapted to be manually moved between a first position wherein erasure is permitted and a second position wherein erasure is prevented;

a second erasure preventing element mounted on said second cassette, said second erasure preventing element being adapted to be manually moved between a first position wherein erasure is permitted and a second position wherein erasure is prevented;

a first set of information terminals disposed in a first predetermined position on said first cassette adjacent said first erasure preventing element, said first predetermined position being located at a first distance from a predetermined edge of said first cassette and in a predetermined positional relationship with said first erasure preventing element;

a second set of information terminals disposed in a second predetermined position on said second cassette adjacent said second erasure preventing element, said second position being located at said first distance from a corresponding predetermined edge of said second cassette and with the same predetermined positional relationship with said second erasure preventing element as said first position has with said first erasure preventing element, and so that a movable detection means, which is movable between first and second operative position and which includes:

a connector which is adapted to interface with said first set of information terminals when said movable detection means is in the first operative position and to interface with said second set of information terminals when said movable detection means is in said second operative position, and a discrimination switch which is responsive to the positioning of first erasure preventing element when said movable detection means is in said first operative position and which is responsive to the positioning of said second erasure preventing element when said movable detection means is in said second operative position, can cooperate with either of said first cassette or said second cassette.

2. A first cassette which is larger than a second cassette, said first cassette comprising:

a first erasure preventing element mounted on said first cassette, said first erasure preventing element being adapted to be manually moved between a first position wherein erasure is permitted and second position wherein erasure is prevented;

a first set of information terminals disposed in a first predetermined position on said first cassette adjacent said first erasure preventing element, said first predetermined position being located at said predetermined distance from a corresponding predetermined edge of said first cassette and with the same predetermined positional relationship with said first erasure preventing element as said second position has with the second erasure preventing element, the second cassette including a second erasure preventing element mounted on the second cassette, the second erasure preventing element being adapted to be manually moved between a first position wherein erasure is permitted and a second position wherein erasure is prevented, and a second set of information terminals disposed in a second predetermined position on the second cassette adjacent the second erasure preventing element, the second predetermined position being located at a predetermined distance from a predetermined edge of the second cassette and in a predetermined positional relationship with the second erasure preventing element;

said first cassette being arranged to cooperate with a movable detection means which is movable between first and second operative positions, which can cooperate with either of said first cassette and the second cassette, and which includes:

a connecter which is adapted to interface with said first set of information terminals when said movable detection means is in the first operative position and to interface with the second set of information terminals when said movable detection means is in said second operative position, and a discrimination switch which is responsive to the positioning of first erasure preventing element when said movable detection means is in said first operative position and which is responsive to the positioning of the second erasure preventing element when said movable detection means is in said second operative position.

3. A first cassette which is smaller than a second cassette, said first cassette comprising:

a first erasure preventing element mounted on said first cassette, said first erasure preventing element being adapted to be manually moved between a first position wherein erasure is permitted and second position wherein erasure is prevented;

a first set of information terminals disposed in a first predetermined position on said first cassette adjacent said first erasure preventing element, said first predetermined position being located at said predetermined distance from a corresponding predetermined edge of said first cassette and with the same predetermined positional relationship with said first erasure preventing element as said second position has with the second erasure preventing element, the second cassette including a second erasure preventing element mounted on the second cassette, the second erasure preventing element being adapted to be manually moved between a first position wherein erasure is permitted and a second position wherein erasure is prevented, and a second set of information terminals disposed in a second predetermined position on the second cassette adjacent the second erasure preventing element, the second predetermined position being located at a predetermined distance from a predetermined edge of the second cassette and in a predetermined positional relationship with the second erasure preventing element;

said first cassette being arranged to cooperate with a movable detection means which is movable between first and second operative positions, which can cooperate with either of said first cassette and the second cassette, and which includes:

a connecter which is adapted to interface with said first set of information terminals when said movable detection means is in the first operative position and to interface with the second set of information terminals when said movable detection means is in said second operative position, and a discrimination switch which is responsive to the positioning of first erasure preventing element when said movable detection means is in said first operative position and which is responsive to the positioning of the second erasure preventing element when said movable detection means is in said second operative position.

* * * * *